(12) United States Patent
Hatori et al.

(10) Patent No.: US 8,256,312 B2
(45) Date of Patent: Sep. 4, 2012

(54) TRANSMISSION AND METHOD OF SHIFT CONTROL FOR TRANSMISSION

(75) Inventors: Hiroki Hatori, Nishio (JP); Takeshige Miyazaki, Nishio (JP); Yoshiki Ito, Nishio (JP); Hiroshi Toyoda, Nishio (JP); Kiyoshi Nagami, Anjo (JE); Atsushi Takeuchi, Anjo (JP)

(73) Assignees: Aisin AI Co., Ltd., Aichi-ken (JP); Aisin AW Co., Ltd., Aichi-ken (JP)

( * ) Notice: Subject to any disclaimer, the term of this patent is extended or adjusted under 35 U.S.C. 154(b) by 352 days.

(21) Appl. No.: 12/729,970

(22) Filed: Mar. 23, 2010

(65) Prior Publication Data

US 2010/0242671 A1 Sep. 30, 2010

(30) Foreign Application Priority Data

Mar. 24, 2009 (JP) ................................. 2009-072023

(51) Int. Cl.
 *F16H 3/08* (2006.01)
 *F16H 59/00* (2006.01)

(52) U.S. Cl. .......................................... 74/330; 74/335

(58) Field of Classification Search .................... 74/330, 74/333, 340, 335
See application file for complete search history.

(56) References Cited

U.S. PATENT DOCUMENTS

| 5,711,409 A * | 1/1998 | Murata ..................... 192/48.611 |
| 2002/0189397 A1* | 12/2002 | Sakamoto et al. .............. 74/661 |
| 2004/0180753 A1* | 9/2004 | Takamura et al. .............. 477/94 |

FOREIGN PATENT DOCUMENTS

JP 2007-292250 11/2007

* cited by examiner

*Primary Examiner* — Ha D. Ho
(74) *Attorney, Agent, or Firm* — IP & T Group LLP

(57) ABSTRACT

A transmission includes a controller that has a rapid-deceleration judge and a rapid-deceleration processor. The rapid-deceleration judge judges whether a vehicle is decelerating rapidly or not. The rapid-deceleration processor includes a torque-fluctuation inhibitor, and an after-rapid-deceleration change-speed stage anticipator. The torque-fluctuation inhibitor shuts off power transmission from a power source, or holds power transmission by way of a current change-speed stage or lower, when the vehicle is decelerating rapidly. The after-rapid-deceleration change-speed stage anticipator anticipates a subsequent change-speed stage being adapted for restarting or reaccelerating the vehicle that has come out of rapid deceleration.

12 Claims, 9 Drawing Sheets

TRANSMISSION AND METHOD OF SHIFT CONTROL FOR TRANSMISSION

INCORPORATION BY REFERENCE

The present invention is based on Japanese Patent Application No. 2009-72,023, filed on Mar. 24, 2009, the entire contents of which are incorporated herein by reference.

BACKGROUND OF THE INVENTION

1. Field of the Invention

The present invention relates to a transmission, and a method of shift control for transmission. In particular, it relates to a dual-clutch transmission comprising two clutches, and a method of shift control for such dual-clutch transmission.

2. Description of the Related Art

One of transmissions for automobile is a dual-clutch transmission that comprises two clutches, namely, which uses a so-called dual-clutch mechanism, (hereinafter abbreviated to as "DCT"). Upon switching change-speed stages, the DCT is characterized in that it can carry out shifting operations quickly without cutting off or interrupting torque transmissions.

As disclosed in Japanese Unexamined Patent Publication (KOKAI) Gazette No. 2007-292,250, for instance, a DCT is controlled for changing speeds so that it can change speeds quickly in accordance with change-speed requests. That is, when a vehicle is traveling with a change-speed stage, which is set on an input shaft that corresponds to one of the clutches being connected, the DOT preliminarily selects (or pre-shifts to) another change-speed stage, which is set on another input shaft that corresponds to the other one of the clutches being disconnected. The DCT usually determines a change-speed stage, which it selects in advance, using a current vehicular condition, such as a vehicle speed and an accelerator opening magnitude, while consulting a shift map.

However, when a driver carries out change-speed operations by a conventional transmission that uses a shift map, he or she might feel slowness or retard to suffer from feelings of annoyance or unpleasantness because ordinary traveling conditions are simulated to prepare the shift map. That is, when a selected change-speed stage might not be appropriate upon restarting or accelerating a vehicle after rapid deceleration, the conventional transmission reselects another change-speed stage and shifts to it again. As a result, the driver might feel annoyance or unpleasantness because of the time that has elapsed since he or she has issued a change-speed request. Alternatively, he or she might feel annoyance or unpleasantness because the conventional transmission has shifted to an inappropriate change-speed stage. Moreover, even during deceleration, the conventional transmission might give the driver feelings of annoyance or unpleasantness because it might select the change-speed stage one after another accompanied by rapid changes in the vehicle speed to result in the occurrence of torque fluctuation.

SUMMARY OF THE INVENTION

The present invention has been developed in view of the aforementioned problematic issues. It is therefore an object of the present invention to provide a transmission and a method of shift control for transmission, transmission and method that anticipate a subsequent change-speed stage on the basis of vehicular condition during rapid deceleration, and which not only exhibit improved response at the time of restarting or accelerating vehicles but also can inhibit torques from fluctuating.

For example, a transmission according to the present invention can achieve the aforementioned object, and comprises:

a first clutch being capable of switching between a connection state being connected to a power source and a disconnection state being disconnected from the power source;

a second clutch being capable of switching between a connection state being connected to the power source and a disconnection state being disconnected from the power source;

a first input shaft being detachably connected to the power source by the first clutch;

a second input shaft being detachably connected to the power source by the second clutch;

an output shaft;

a first change-speed mechanism being disposed between the first input shaft and the output shaft, and comprising a first gear mechanism for making a combination of a plurality of change-speed stages and a first gear-mechanism selector for selecting one of the change-speed stages;

a second change-speed mechanism being disposed between the second input shaft and the output shaft, and comprising a second gear mechanism for making a combination of a plurality of change-speed stages and a second gear-mechanism selector for selecting one of the change-speed stages;

a controller for controlling the first clutch, the second clutch, the first gear-mechanism selector, and the second gear-mechanism selector, and comprising a change-speed controller for adopting one of the change-speed stages, which can be selected by one of the first gear-mechanism selector and second gear-mechanism selector being set on one of the first input shaft and second input shaft that the first clutch and/or second clutch disconnects from the power source, as a subsequent change-speed stage and then having the one of the first gear-mechanism selector and second gear-mechanism selector operate with the subsequent change-speed stage;

the controller further comprising:

a rapid-deceleration judge for judging whether a vehicle is in ordinary condition or in rapid-deceleration condition;

a rapid-deceleration processor including a torque-fluctuation inhibitor, and an after-rapid-deceleration change-speed stage anticipator;

the torque-fluctuation inhibitor being adapted for putting the one of the first gear-mechanism selector and second gear-mechanism selector in no-power transmission state in which power transmission from the power source is shut off, or in power transmission state in which the one of the first gear-mechanism selector and the second gear-mechanism selector is held in power transmission by way of a current change-speed stage or other change-speed stages being lower than the current change-speed stage, when the vehicle is in the rapid-deceleration condition; and the after-rapid-deceleration change-speed stage anticipator being adapted for anticipating a subsequent change-speed stage being adapted for restarting or reaccelerating the vehicle that has come out of the rapid-deceleration condition, and then operating the other one of the first gear-mechanism selector and second gear-mechanism selector that can cope with the resulting subsequent change-speed stage.

In a first optional setting of the present transmission, the after-rapid-deceleration change-speed stage anticipator can preferably anticipate at least one change-speed stage from the group consisting of the lowest change-speed stage of the change-speed stages of one of the first gear mechanism and second gear mechanism that is associated with one of the first clutch and second clutch being put in the connected and disconnected states alternately, a change-speed stage that is lower by one stage than the subsequent change-speed stage that the change-speed controller has adopted, and change-speed stages that are lower by many stages than the adopted subsequent change-speed stage.

In a second optional setting of the present transmission, the after-rapid-deceleration change-speed stage anticipator can preferably consult a shift map for rapid deceleration to anticipate the subsequent change-speed stage using a state of the vehicle. Note herein that it is possible to give the following to employ as the "state of vehicle": a vehicle speed, an accelerator opening magnitude, an input revolution, a temperature (e.g., an oil temperature, an engine-coolant temperature, and an ambient temperature), a vehicle acceleration, and an input/output relative revolution.

In a third optional setting of the present transmission, the controller can preferably further comprise a corrector for correcting the shift map for rapid deceleration, which is directed to the second optional setting, on the basis of comparison between the subsequent change-speed stage, which the after-rapid-deceleration change-speed stage anticipator has anticipated, and a subsequent change-speed stage, which is derived from a vehicular condition of the vehicle that has come out of the rapid-deceleration condition as well as a common shift map.

In a fourth optional setting of the present transmission, the rapid-deceleration judge can preferably comprise a deceleration calculator for calculating deceleration, and can preferably judge that the vehicle is in the rapid-deceleration condition when a calculated deceleration is greater than a predetermined value.

In a fifth optional setting of the present transmission, the rapid-deceleration judge can preferably comprise a deceleration calculator for calculating deceleration, and an accessible map for making it possible to judge whether the vehicle is in the rapid-deceleration condition or in ordinary-deceleration condition on the basis of comparison between a calculated deceleration and a state of the vehicle, and can preferably apply a current deceleration and a current state of the vehicle to the accessible map to judge whether the vehicle is in the rapid-deceleration condition or in the ordinary-deceleration condition.

Moreover, a method of shift control for transmission according to the present invention can achieve the aforementioned object as well. The present shift-control method is adapted, for instance, for transmission comprising:

a first clutch being capable of switching between a connection state being connected to a power source and a disconnection state being disconnected from the power source;

a second clutch being capable of switching between a connection state being connected to the power source and a disconnection state being disconnected from the power source;

a first input shaft being detachably connected to the power source by the first clutch;

a second input shaft being detachably connected to the power source by the second clutch;

an output shaft;

a first change-speed mechanism being disposed between the first input shaft and the output shaft, and comprising a first gear mechanism for making a combination of a plurality of change-speed stages and a first gear-mechanism selector for selecting one of the change-speed stages;

a second change-speed mechanism being disposed between the second input shaft and the output shaft, and comprising a second gear mechanism for making a combination of a plurality of change-speed stages and a second gear-mechanism selector for selecting one of the change-speed stages;

a controller for controlling the first clutch, the second clutch, the first gear-mechanism selector, and the second gear-mechanism selector, and comprising a change-speed controller for adopting one of the change-speed stages, which can be selected by one of the first gear-mechanism selector and second gear-mechanism selector being set on one of the first input shaft and second input shaft that the first clutch and/or second clutch disconnects from the power source, as a subsequent change-speed stage and then having the one of the first gear-mechanism selector and second gear-mechanism selector operate with the subsequent change-speed stage; and the present shift-control method comprises the steps of:

having the controller judge whether a vehicle is in ordinary condition or in rapid-deceleration condition;

having the controller put the one of the first gear-mechanism selector and second gear-mechanism selector in no-power transmission state in which power transmission from the power source is shut off, or in power transmission state in which the one of the first gear-mechanism selector and the second gear-mechanism selector is held in power transmission by way of a current change-speed stage or other change-speed stages being lower than the current change-speed stage, when the vehicle is in the rapid-deceleration condition;

having the controller anticipate a subsequent change-speed stage being adapted for restarting or reaccelerating the vehicle that has come out of the rapid-deceleration condition; and having the controller operate the other one of the first gear-mechanism selector and second gear-mechanism selector that can cope with the resulting subsequent change-speed stage.

In a first optional setting of the present shift-control method, it is preferable that the controller can be operated to anticipate at least one change-speed stage from the group consisting of the lowest change-speed stage of the change-speed stages of one of the first gear mechanism and second gear mechanism that is associated with one of the first clutch and second clutch being put in the connected and disconnected states alternately, a change-speed stage that is lower by one stage than the subsequent change-speed stage that the change-speed controller has adopted, and change-speed stages that are lower by many stages than the adopted subsequent change-speed stage in the step of having the controller anticipate.

In a second optional setting of the present shift-control method, it is preferable that the controller can be operated to consult a shift map for rapid deceleration to anticipate the subsequent change-speed stage using a state of the vehicle in the step of having the controller anticipate.

In a third optional setting of the present shift-control method, it is preferable that the shift-control method can further comprise a step of having the controller correct the shift map for rapid deceleration, which is relevant to the second optional setting, on the basis of comparison between the subsequent change-speed stage, which the controller has anticipated in the step of having the controller anticipate, and a subsequent change-speed stage, which is derived from a vehicular condition of the vehicle that has come out of the rapid-deceleration condition as well as a common shift map.

In a fourth optional setting of the present shift-control method, it is preferable that the controller can be operated to calculate deceleration and judge that the vehicle is in the rapid-deceleration condition when a calculated deceleration is greater than a predetermined value in the step of having the controller judge.

In a fifth optional setting of the present shift-control method, it is preferable that the controller can be operated to calculate deceleration, and to access a map for making it possible to judge whether the vehicle is in the rapid-deceleration condition or in ordinary-deceleration condition on the basis of comparison between a calculated deceleration and a state of the vehicle, and then to apply a current deceleration and a current state of the vehicle to the map to judge whether the vehicle is in the rapid-deceleration condition or in the ordinary-deceleration condition in the step of having the controller judge.

The transmission according to the present invention comprises a controller. The controller is provided with a rapid-deceleration judge, and a rapid-deceleration processor. The rapid-deceleration judge judges whether a vehicle is in ordinary condition or in rapid-deceleration condition when the vehicle is decelerating. Then, when the rapid-deceleration judge judges that the vehicle is in the rapid-deceleration condition, the controller actuates the rapid-deceleration processor. The rapid-deceleration processor includes a torque-fluctuation inhibitor, and an after-rapid-deceleration change-speed stage anticipator. The torque-fluctuation inhibitor shuts off torque transmission from a power source, or holds on a current change-speed stage to stop switching to the other change-speed stages. Accordingly, the present transmission makes it possible to reduce feelings of annoyance or unpleasantness to drivers. Moreover, the after-rapid-deceleration change-speed stage anticipator anticipates or estimates a change-speed stage that is appropriate for a vehicle condition after rapid deceleration. Consequently, the present transmission exhibits improved response to the issuance of change-speed requests because the after-rapid-deceleration change-speed stage anticipator enables the controller to have the present transmission select or shift to an adequate change-speed stage when the vehicle restarts or accelerates. Moreover, since the after-rapid-deceleration change-speed stage anticipator enables the controller to have the present transmission select or shift to a change-speed stage that is suitable for a vehicular condition after rapid deceleration, the present transmission does not produce any feelings of annoyance or unpleasantness at all that result from selecting or shifting to an inappropriate change-speed stage. Note that the "rapid-deceleration condition" indicates herein such a state that change-speed operations are carried out successively because a change-speed controller, one of the controller's elements, picks up or elects change-speed stages one after another, which are associated with one of dual clutches that are put in the connected and disconnected states alternately, while a driver keeps turning on a brake or stepping on a brake pedal. Moreover, the more inappropriate the picked-up change-speed stage is the more the vehicular condition fluctuates. The change-speed controller usually predicts or anticipates a subsequent change-speed stage from a current vehicular condition without considering whether the vehicle is accelerating, decelerating slowly or decelerating rapidly. However, when the vehicle decelerates rapidly, the vehicle speed drops suddenly. Accordingly, the predicted or anticipated change-speed state does not fit to situations after the rapid deceleration. Consequently, the change-speed stage is switched one after another in order to cope with the sudden change in the vehicle speed. Thus, torque fluctuations occur.

In the first optional setting that is directed to the present transmission, the after-rapid-deceleration change-speed anticipator has the controller adopt a change-speed stage that is lower by one stage or many stages than a change-speed stage that a change-speed controller that has been used for ordinary vehicles conventionally has anticipated, or the lowest change-speed stage of all change-speed stages available. Accordingly, when the conventional change-speed stage controller picks up or elects an inappropriate change-speed stage while a vehicle is decelerating rapidly, the controller adopts one of lower change-speed stages of all available change-speed stages, or a change-speed stage being lower than the change-speed stage that the conventional change-speed controller has predicted or estimated. Consequently, the present transmission is shifted to a change-speed stage that is suitable for restarting or reaccelerating the vehicle after rapid deceleration. The after-rapid-deceleration change-speed stage anticipator can anticipate or estimate an adequate change-speed stage as a subsequent change-speed stage without increasing the processing load to the controller, because the after-rapid-deceleration change-speed anticipator elects one of the change-speed stages, which make the basis of anticipation, from data that are obtainable from the conventional change-speed controller being directed to the present invention.

In the second optional setting that is directed to the present transmission, the after-rapid-deceleration change-speed stage anticipator uses a shift map for rapid deceleration, instead of a common shift map, to anticipate or estimate a subsequent change-speed stage. Thus, the after-rapid-deceleration change-speed stage anticipator enables the controller to predict or estimate a change-speed stage that is suitable for restarting or reaccelerating a vehicle after rapid deceleration.

In the third optional setting that is directed to the present transmission, the controller further comprises a corrector. The corrector corrects the shift map that the after-rapid-deceleration change-speed stage anticipator uses to anticipate or estimate an after-rapid-deceleration change-speed stage. As a result, the corrector enables the controller to predict or estimate a more suitable change-speed stage as an after-rapid-deceleration subsequent change-speed stage.

In the fourth optional setting that is directed to the present transmission, the rapid-deceleration judge comprises a deceleration calculator. Before the rapid-deceleration judge judges whether a vehicle is in rapid-deceleration condition, the deceleration calculator calculates deceleration. Then, the rapid-deceleration judge judges that the vehicle is decelerating rapidly when the resulting deceleration is greater than a predetermined value. Thus, computing deceleration, and then comparing the computed deceleration with a predetermined value reduce the processing load to the rapid-deceleration judge for judging or determining that a vehicle is decelerating rapidly.

In the fifth optional setting that is directed to the present transmission, the rapid-deceleration judge comprises a deceleration calculator, and an accessible map. The deceleration calculator computes deceleration. The accessible map is specialized for judging or determining whether a vehicle is decelerating rapidly or not. Then, the rapid-deceleration judge applies the resultant calculated deceleration and a vehicular condition to the accessible map, or consults the accessible map using these data, in order to judge whether the vehicle is decelerating rapidly or not. As a result, the rapid-deceleration judge can judge or determine that a vehicle is in rapid-deceleration condition more accurately.

The shift-control method for transmission according to the present invention comprises a step of having the controller judge whether a vehicle is in ordinary condition or in rapid-deceleration condition. Then, when the vehicle is decelerating rapidly, a subsequent step is executed, namely having the controller shut off one of the first gear-mechanism selector and second gear-mechanism selector from power transmission that comes from the power source, or hold on a current change-speed stage to stop switching to the other change-speed stages. Accordingly, the present shift-control method for transmission enables the transmission to reduce feelings of annoyance or unpleasantness to drivers. Moreover, the present shift-control method further comprises a step of having the controller anticipate or estimate a change-speed stage that is appropriate for a vehicle condition after rapid deceleration. Consequently, the present shift-control control method enables the transmission to exhibit improved response to the issuance of change-speed requests because the controller is operated to have the transmission select or shift to an adequate change-speed stage when the vehicle restarts or accelerates. Moreover, since the controller is operated to have the transmission select or shift to a change-speed stage that is suitable for a vehicular condition after rapid deceleration, the present shift-control method for transmission does not result in producing any feelings of annoyance or unpleasantness at all that result from selecting or shifting to an inappropriate change-speed stage.

In the first optional setting that is relevant to the present shift-control method for transmission, the controller is operated to adopt the following change-speed stages in the step of having the controller anticipate: a change-speed stage that is lower by one stage or many stages than a change-speed stage that a change-speed controller that has been used conventionally for ordinary vehicles has anticipated; or the lowest change-speed stage of all change-speed stages available. Accordingly, when the conventional change-speed stage controller picks up or elects an inappropriate change-speed stage while a vehicle is decelerating rapidly, the controller is operated to adopt one of lower change-speed stages of all available change-speed stages, or a change-speed stage being lower than the change-speed stage that the conventional change-speed controller has predicted or estimated. Consequently, in the present shift-control method for transmission, the controller is operated to enable the transmission to shift to a change-speed stage that is suitable for restarting or reaccelerating the vehicle after rapid deceleration. The present shift-control method according to the present invention does not increase the processing load to the controller for anticipating or estimating an adequate change-speed stage as a subsequent change-speed stage, because the controller is operated to elect one of the change-speed stages, which make the basis of anticipation, from data that are obtainable from the conventional change-speed controller that constitutes the controller being directed to the present invention.

In the second optional setting that is relevant to the present shift-control method for transmission, the controller is operated to consult a shift map for rapid deceleration, instead of a common shift map, to anticipate or estimate a subsequent change-speed stage in the step of having the controller anticipate. Thus, the present shift-control method enables the controller to predict or estimate a change-speed stage that is suitable for restarting or reaccelerating a vehicle after rapid deceleration.

The third optional setting that is relevant to the present shift-control method for transmission further comprises a step of having the controller correct the shift map that is directed to the second optional setting. The controller is operated to correct the shift map that is used for anticipating or estimating an after-rapid-deceleration change-speed stage. As a result, the present shift-control method enables the controller to predict or estimate a more suitable change-speed stage as an after-rapid-deceleration subsequent change-speed stage.

In the fourth optional setting that is relevant to the present shift-control method for transmission, the controller is operated to calculate deceleration. Before judging whether a vehicle is in rapid-deceleration condition, the controller is operated to calculate deceleration. Then, the controller is operated to judge that the vehicle is decelerating rapidly when the resulting deceleration is greater than a predetermined value. Thus, in the fourth optional setting, the processing load to the controller is less in judging or determining that a vehicle is decelerating rapidly, because the controller is operated to compute deceleration and then compare the computed deceleration with a predetermined value to carry out the judgment.

In the fifth optional setting that is relevant to the present shift-control method for transmission, the controller is operated to calculate deceleration, and to access a map for enabling the controller to judge of which conditions a vehicle is in. Then, the controller is operated to apply the resultant calculated deceleration and a vehicular condition to the accessible map, or to consult the accessible map using these data, in order to judge whether the vehicle is decelerating rapidly or not. As a result, the present shift-control method enables the controller to judge or determine that a vehicle is in rapid-deceleration condition more accurately.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms apart of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

Representative embodiments according to the present invention will be hereinafter described with reference to FIGS. 1 through 13. Transmissions that are directed to the present embodiments are mounted on a vehicle, respectively. Note that the drawings used for making descriptions are conceptual diagrams and accordingly might not necessarily illustrate the transmissions' specific parts exactly.

Figure 1:
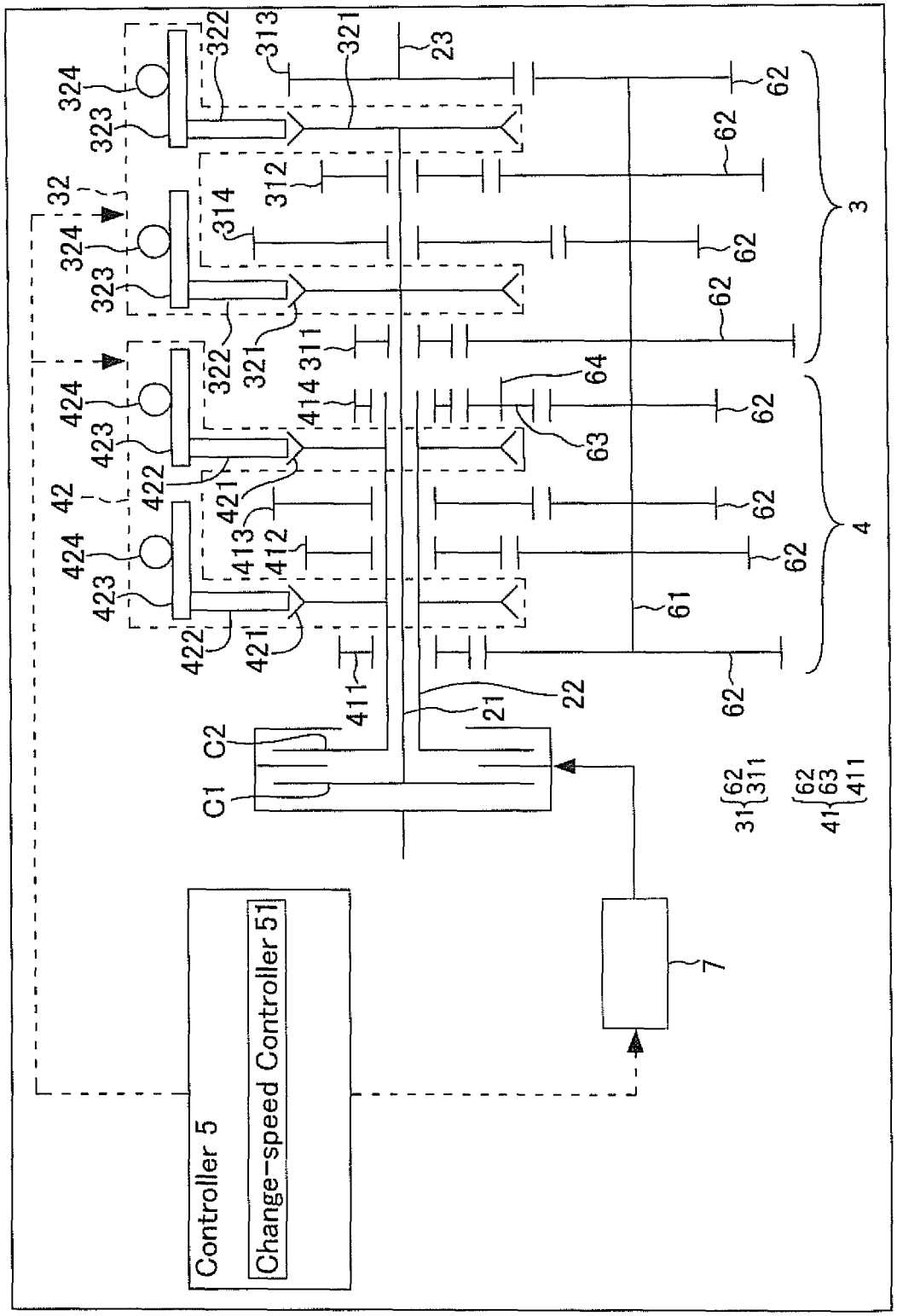
FIG. 1 is an explanatory diagram for illustrating a construction of a transmission 1 according to Embodiment No. 1 of the present invention.

As shown in FIG. 1, a transmission 1 according to the present invention comprises a first clutch "C1," a second clutch "C2," a first input shaft 21, a second input shaft 22, an output shaft 23, a first change-speed mechanism 3, a second change-speed mechanism 4, and a controller 5.

The first clutch "C1" is positioned between an internal combustion engine (or engine (not shown in the drawing)), which serves as a power source, and the first input shaft 21, which will be detailed later. The first clutch "C1" is a device for alternately transmitting and not transmitting an output torque from the internal combustion engine to the first input shaft 21. When the first clutch "C1" transmits an output torque from the internal combustion engine to the first input shaft 21, it is in the connected state. When the first clutch "C1" does not transmit any torque from the internal combustion engine to the fist input shaft 21, it is in the disconnected state.

The second clutch "C2" is positioned between the internal combustion engine and the second input shaft 22 that will be detailed later. The second clutch "C2" is a device for alternately transmitting and not transmitting an output torque from the internal combustion engine to the second input shaft 22. When the second clutch "C2" transmits an output torque from the internal combustion engine to the second input shaft 22, it is in the connected state. When the second clutch "C2" does not transmit any torque from the internal combustion engine to the second input shaft 22, it is in the disconnected state.

The first clutch "C1" and second clutch "C2" are controlled by signals, which the controller 5 that will be detailed later produces. Note however that an electric actuator or a fluid-pressure hydraulic system serves as a power source for actuating the first clutch "C1" and second clutch "C2."

The first input shaft 21 is a rod-shaped member that couples with the first clutch "C1" to transmit a rotary torque. The second input shaft 22 is a cylinder-shaped member that couples with the second clutch "C2" to transmit a rotary torque. Note that the second input shaft 22 is disposed coaxially with the first input shaft 21 and is placed on an outer peripheral side to the first input shaft 21.

The output shaft 23 is a rod-shaped member that is disposed parallel to the first input shaft 21 and second input shaft 22. The output shaft 23 outputs an output torque, which is transmitted via the first change-speed mechanism 3 and second change-speed mechanism 4 that will be detailed later, to wheels (not shown).

The first change-speed mechanism 3 comprises a first gear mechanism 31, and a first gear-mechanism selector 32. The first gear mechanism 31 is a combination of a first-speed change-speed stage, a third-speed change-speed stage, a fifth-speed change-speed stage, and a seventh-speed change-speed stage that are disposed between the first input shaft 21 and the output shaft 23. Moreover, the first change-speed mechanism 3 further comprises a not-shown synchronizer that is disposed between each of the change-speed stages and later-described sleeves 321. The respective change-speed stages are made up of change-speed gears 311 through 314, a first counter shaft 61, and counter gears 62 that correspond to the change-speed gears 311 through 314. The change-speed gears 311 through 314 are placed on an outer peripheral side to the first input shaft 21, and are retained rotatably and relatively to the first input shaft 21. The counter shaft 61 is disposed parallel to the first input shaft 21 and second input shaft 22. The first counter gears 62 are fastened rotatably and integrally with the counter shaft 61. The change-speed gear 311 makes the first-speed change-speed stage. The change-speed gear 312 makes the third-speed change-speed stage. The change-speed gear 313 makes the fifth-speed change-speed stage. The change-speed gear 314 makes the seventh-speed change-speed stage.

The first gear-mechanism selector 32 comprises sleeves 321, forks 322, fork shafts 323, and actuators 324. The sleeves 321 are placed on an outer peripheral side to the first input shaft 21, and are retained rotatably and integrally with the first input shaft 21. Moreover, the sleeves 32 are made of a cylindrical member that is positioned between the two change-speed stages, respectively. To be concrete, the following embodiments according to the present invention comprise two sleeves 321 in total, one of which is disposed between the first-speed change-speed stage and the seventh-speed change-speed stage, and the other one of which is disposed between the third-speed change-speed stage and the fifth-speed change-speed stage. The sleeves 321 are provided with a neutral position at which they do not engage with either one of the change-speed stages, and an engagement position at which they engage with either one of the change-speed stages. Moreover, the sleeves 321 move between the neutral position and the engagement position in the axial direction. The forks 322 are placed on an outer peripheral side to the sleeves 321, respectively. Moreover, the forks 322 engage with the sleeves 321, respectively, so as to enable the sleeves 321 to move between the two change-speed stages (or between the neutral position and the engagement position) while rotating. The fork shafts 323 are made of a rod-shaped member that engages integrally with the forks 322, respectively. In addition, the actuators 324 actuate the fork shafts 323 so that the fork shafts 323 can move simultaneously with the actuation of the sleeves 321 by the forks 322.

The second change-speed mechanism 4 comprises a second gear mechanism 41, and a second gear-mechanism selector 42. The second gear mechanism 41 is a combination of a second-speed change-speed stage, a fourth-speed change-speed stage, a sixth-speed change-speed stage, and a reverse (or retreat) stage that are disposed between the second input shaft 22 and the output shaft 23. Moreover, the second change-speed mechanism 4 further comprises a not-shown synchronizer that is disposed between each of the change-speed stages and later-described sleeves 421. The respective change-speed stages are made up of change-speed gears 411 through 414, the counter shaft 61, and second counter gears 62 that correspond to the change-speed gears 411 through 414. The change-speed gears 411 through 414 are placed on an outer peripheral side to the second input shaft 22, and are retained rotatably and relatively to the second input shaft 22. The second counter gears 62 are fastened rotatably and integrally with the counter shaft 61. The change-speed gear 411 makes the second change-speed stage. The change-speed gear 412 makes the fourth-speed change-speed stage. The change-speed gear 413 makes the sixth-speed change-speed stage. The change-speed gear 414 makes the reverse stage.

Note that the reverse stage is further provided with an idler gear 63 that is disposed between the change-speed gear 414 and one of the second counter gears 62. The idler gear 63 is retained rotatably to an idler-gear shaft 64. The idler-gear shaft 64 is disposed parallel to the first input shaft 21, second input shaft 22 and counter shaft 61, but is fixed unrotatably. When the controller 5 that will be detailed layer selects the reverse stage as a change-speed stage, a rotation of the second input shaft 22 is transmitted to the change-speed gear 414 of the reverse stage to rotate the idler gear 63. Then, the corresponding counter gear 62 rotates to rotate the counter shaft 61.

The second gear-mechanism selector 42 comprises sleeves 421, forks 422, fork shafts 423, and actuators 424. The sleeves 421 are placed on an outer peripheral side to the second input shaft 22, and are retained rotatably and integrally with the second input shaft 22. Moreover, the sleeves 421 are made of a cylindrical member that is positioned between the two change-speed stages, respectively. To be concrete, the following embodiments according to the present invention comprise two sleeves 421 in total, one of which is disposed between the second-speed change-speed stage and the fourth-speed change-speed stage, and the other one of which is disposed between the sixth-speed change-speed stage and the reverse stage. The sleeves 421 are provided with a neutral position at which they do not engage with either one of the change-speed stages, and an engagement position at which they engage with either one of the change-speed stages. Moreover, the sleeves 421 move between the neutral position and the engagement position in the axial direction. The forks 422 are placed on an outer peripheral side to the sleeves 421, respectively. Moreover, the forks 422 engage with the sleeves 421, respectively, so as to enable the sleeves 421 to move between the two change-speed stages (or between the neutral position and the engagement position) while rotating. The fork shafts 423 are made of a rod-shaped member that engages integrally with the forks 422, respectively. In addition, the actuators 424 actuate the fork shafts 423 so that the fork shafts 423 can move simultaneously with the actuation of the sleeves 421 by the forks 422.

The first gear-mechanism selector 32 and second gear-mechanism selector 42 are controlled by signals, which the controller 5 that will be detailed later produces. Moreover, the actuators 324 and 424 are driven by an electric cylinder, a fluid-pressure hydraulic cylinder or a pneumatic cylinder, respectively, which commonly serves as a power source.

The controller 5 controls the first clutch "C1," the second clutch "C2," the first gear-mechanism selector 32, and the second gear-mechanism selector 42. Moreover, the controller 5 comprises a change-speed controller 51. The change-speed stage controller 51 picks up or elects a subsequent change-speed stage, and then operates one of the first gear-mechanism selector 32 and second gear-mechanism selector 42, which can cope with the elected subsequent change-speed stage, so as to pre-shift to it. The controller 5 adopts a subsequent change-speed stage from the change-speed stages of one of the first gear mechanism 31 and second gear mechanism 4 that are set on one of the first input shaft 21 and second input shaft 22 that is disconnected from the power source by the first clutch "C1" and/or second clutch "C2" that is put in the connected and disconnected states alternately.

The transmission 1 according to the present invention will be hereinafter described in detail while specifying various embodiments on the controller 5, because the present transmission 1 is characterized in the controller 5.

Embodiment No. 1

Figure 2:
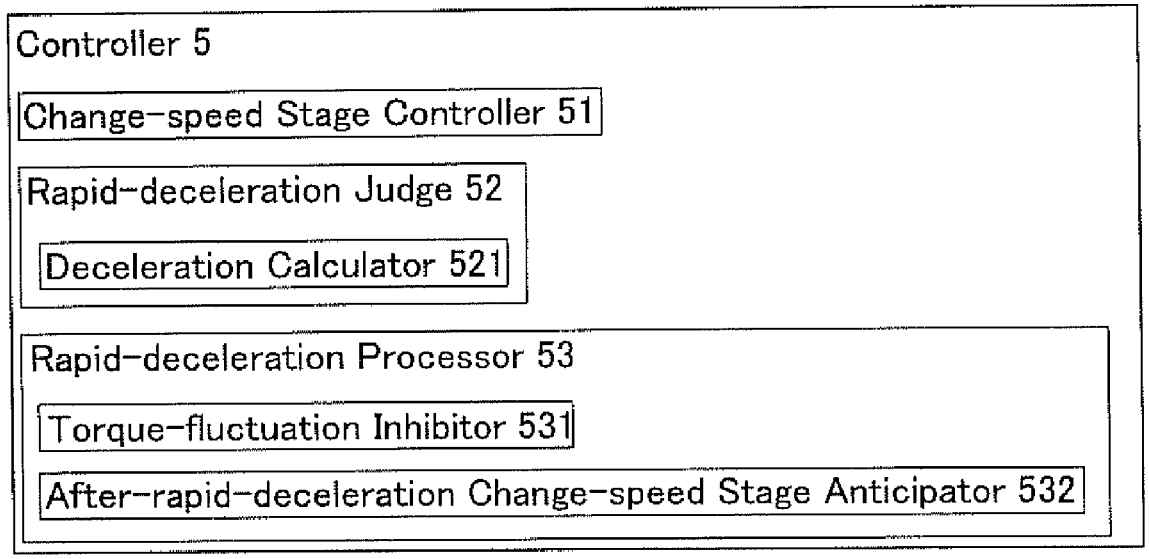
FIG. 2 is an explanatory block diagram for illustrating a controller 5 that makes the transmission 1 according to Embodiment No. 1.

As illustrated in FIG. 2, the present transmission 1 according to Embodiment No. 1 uses the controller 5 that comprises the change-speed controller 51, a rapid-deceleration judge 52, and a rapid-deceleration processor 53. FIG. 2 is an explanatory diagram which depicts the controller 5 alone that is taken out of the present transmission 1.

The rapid-deceleration judge 52 is provided with a deceleration calculator 521. The deceleration calculator 521 calculates deceleration. The deceleration is a rate of decrease of a vehicle's speed within a constant period of time, and is expressed by negative values. Note herein that the greater the absolute value of the deceleration is the greater extent a vehicle decreases the speed. The deceleration calculator 521 uses an acceleration sensor or speed sensor to find the deceleration from vehicle speeds, accelerator opening magnitudes, input revolutions, temperatures (e.g., oil temperatures, engine-coolant temperatures, and ambient temperatures), vehicle accelerations, and input/output relative revolutions. Moreover, the rapid-deceleration judge 52 judges that a vehicle is decelerating rapidly when the deceleration that the deceleration calculator 521 computes is a predetermined value or less.

The rapid-deceleration processor 53 is provided with a torque-fluctuation inhibitor 531, and an after-rapid-deceleration change-speed stage anticipator 532. The torque-fluctuation inhibitor 531 puts the first clutch "C1" and second clutch "C2" in the connected and disconnected states alternately so that power is not transmitted to them from the power source. Alternatively, the torque-fluctuation inhibitor 531 has one of the first gear-mechanism 32 and second gear-mechanism 42 hold on a current change-speed stage, or shift to one of change-speed stages that are lower than the current change-speed stage, so that the transmission 1 does not carry out the change-speed operation many times. The torque-fluctuation inhibitor 531 can keep the first clutch "C1" and second clutch "C2" being connected and disconnected alternately for a time period while the rapid-deceleration judge 52 is judging that a vehicle is in rapid-deceleration condition. The after-rapid-deceleration change-speed stage anticipator 532 adopts a change-speed stage that is lower by one stage or many stages than the change-speed stage that the change-speed controller 51 has elected, or the lowest change-speed stage of all the change-speed stages that are associated with one of the first clutch "C1" and second clutch "C2" being connected or disconnected alternately, as a subsequent change-speed stage.

Figure 3:
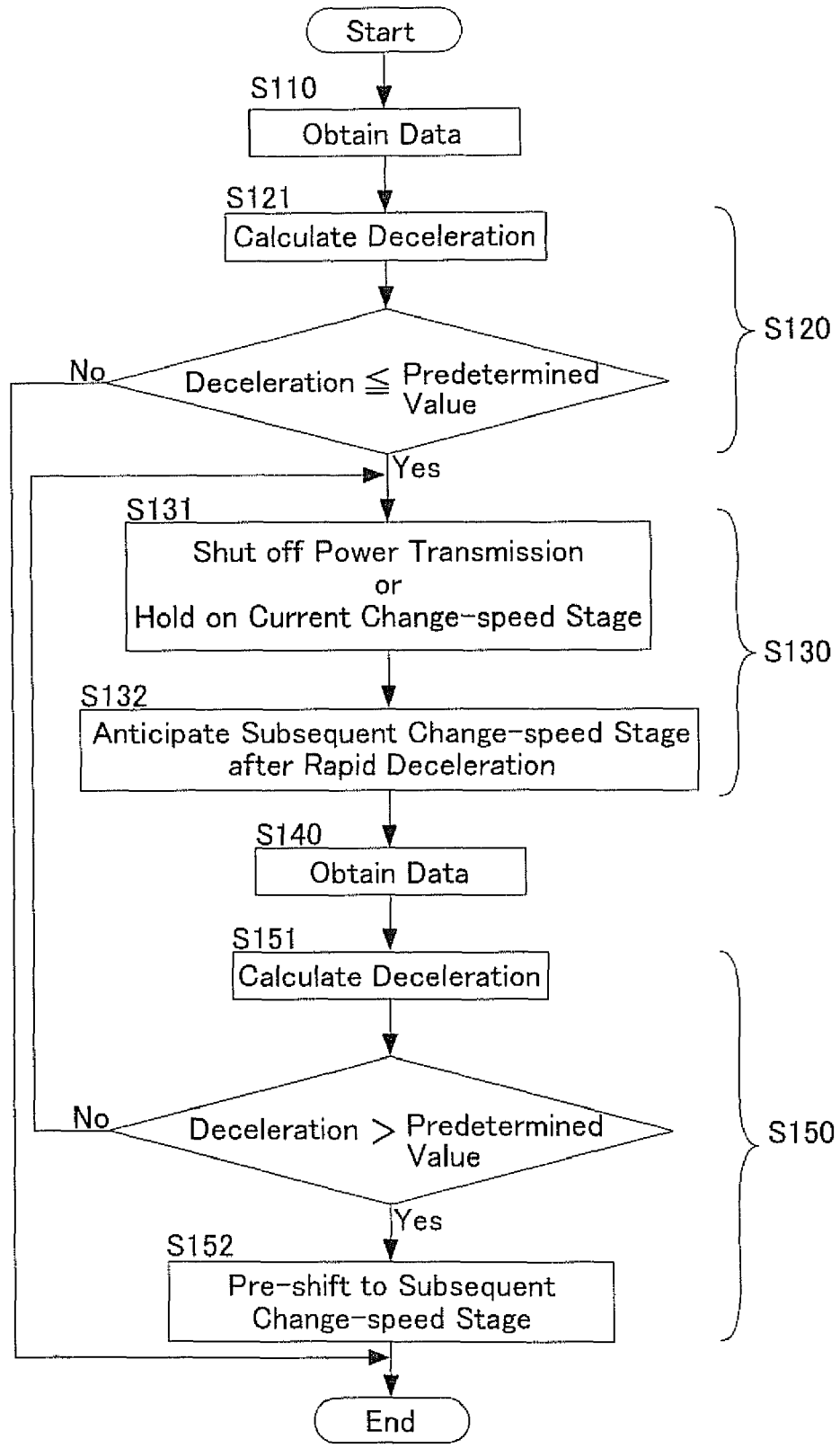
FIG. 3 is a representative flowchart for illustrating a method of shift control for transmission according to Embodiment No. 1.

Next, a shift-control method for transmission will be described, shift-control method which the present transmission 1 according to Embodiment No. 1 employs. The controller 5 controls the transmission 1. FIG. 3 illustrates a flowchart for the shift-control method for the transmission 1 that the controller 5 executes representatively. Note that the present invention is not limited to FIG. 3 because the flowchart merely specifies one of the examples of the logic for the shift-control method.

As shown in FIG. 3, the controller 5 executes a data obtaining step "S110," a rapid-deceleration judging step "S120," a rapid-deceleration processing step "S130," a data re-obtaining step "S140," and a rapid-deceleration re-judging step "S150." At the data obtaining step "S110," the controller 5 obtains a state of vehicle, for instance, as data. The controller 5 computes deceleration based on the obtained data at the rapid-deceleration judging step "S120," especially, at a deceleration computing sub-step "S121." The deceleration is a rate of decrease of a vehicle's speed within a constant period of time, and the sign is negative. Using an acceleration sensor or speed sensor, the controller 5 finds the deceleration from the following: vehicle speeds; accelerator opening magnitudes; input revolutions; temperatures (e.g., oil temperatures, engine-coolant temperatures, and ambient temperatures); vehicle accelerations; and input/output relative revolutions. Then, when the computed deceleration is a predetermined value or less, the controller 5 judges that a vehicle is decelerating rapidly. When the computed deceleration is greater than the predetermined value, the controller 5 terminates these specific control steps that this flowchart illustrates, and carries out the ordinary processes of control.

At the rapid-deceleration processing step "S130," especially, at a torque-fluctuation inhibiting sub-step "S131," the controller 5 first connects and disconnects the first clutch "C1" and second clutch "C2" alternately to shut off the power transmission from the power source. Alternatively, at the torque-fluctuation inhibiting sub-step "S131," the controller 5 has one of the first gear-mechanism selector 32 and second gear-mechanism selector 42 hold on the current change-speed stage or shift one of them to a lower change-speed stage than the current change-speed stage in order for the transmission 1 not to carry out the change-speed operation many times. Moreover, the controller 5 anticipates or estimates a subsequent change-speed stage that is required for restarting or reaccelerating the vehicle when the vehicle has come out the rapid-deceleration condition at the rapid-deceleration processing step "S130," especially, at an after-rapid-deceleration change-speed stage anticipating sub-step "S132." Specifically, at the after-rapid-deceleration change-speed stage anticipating sub-step "S132," the controller 5 adopts a lower change-speed stage, which is lower by one stage or many stages than the change-speed stage that the change-speed controller 51 has elected, as a subsequent change-speed stage. In addition, the controller 5 operates one of the first gear-mechanism selector 32 and second gear-mechanism selector 42, which can cope with the adopted subsequent change-speed stage, to pre-shift to it. Note that, in addition to executing the control steps that the flowchart shown in FIG. 3 specifies, the change-speed controller 51 picks up or elects a change-speed stage regularly based on current vehicular conditions whenever necessary, regardless of situations whether the vehicle is decelerating rapidly or not. Moreover, the greater the deceleration is the lower change-speed stage the controller 5 adopts as a subsequent change-speed stage at the after-rapid-deceleration change-speed stage anticipating sub-step "S132."

At the data re-obtaining step "S140," the controller 5 obtains another state of the vehicle, for instance, again as data. Moreover, the controller 5 computes deceleration based on the obtained data at the rapid-deceleration re-judging step "S150," especially, at a deceleration re-computing sub-step "S151." Moreover, at the rapid-deceleration re-judging step "S150," especially, at a pre-shifting sub-step "S152," the controller 5 actuates one of the first gear-mechanism selector 32 and second gear-mechanism selector 42 to pre-shift to the change-speed stage that it has predicted or estimated at the after-rapid-deceleration change-speed stage sub-step "S132" when the computed deceleration is greater than the predetermined value. When the computed deceleration is the predetermined value or less, the control procedure returns back to the rapid-deceleration processing step "S130" Then, the controller 5 redoes the procedure for processing situations where the vehicle is decelerating rapidly. Thus, the controller 5 carries out the rapid-deceleration processing step "S130" through the rapid-deceleration re-judging step "S150" until the vehicle has come out of the rapid-deceleration condition.

The present transmission 1 according to Embodiment No. 1 comprises the controller 5 that is provided with the rapid-deceleration judge 52. The present shift-control method according to Embodiment No. 1 comprises the rapid-deceleration judging step "S120." The rapid-deceleration judge 52 judges at the rapid-deceleration judging step "S120" whether a vehicle is decelerating ordinarily or rapidly. When the vehicle is in rapid-deceleration condition, the rapid-deceleration judge 52 actuates the torque-fluctuation inhibitor 53, another element of the controller 5, to shut off power transmission from the power source, or to inhibit the transmission 1 from switching between the change-speed stages, at the rapid-deceleration processing step "S130," another step of the present shift-control method according to Embodiment No. 1, where the controller 5 is operated to shut off power transmission from the power source, or to inhibit the transmission 1 from switching between the change-speed stages. Thus, the present transmission 1 and shift-control method according to Embodiment No. 1 inhibit torque fluctuations that result from switching between change-speed stages, thereby making it possible to reduce feelings of annoyance or unpleasantness that result from the torque fluctuations. Moreover, the rapid-deceleration processor 53 is provided with the after-rapid-deceleration change-speed stage anticipator 532 that anticipates or estimates change-speed stages that fit for after-rapid-deceleration vehicular conditions. The rapid-deceleration processing step "S130" is provided with the after-rapid-deceleration change-speed sub-stage "S132" where the controller 5 is operated to anticipate or estimate change-speed stages that fit for after-rapid-deceleration vehicular conditions. Therefore, the transmission 1 shows upgraded response to change-speed request because the present transmission 1 and shift-control method according to Embodiment No. 1 make it possible to select an adequate change-speed stage when a vehicle restarts or accelerates. Moreover, the selected change-speed stage does not lead to the occurrence of feelings of annoyance or unpleasantness because it is a change-speed stage that is appropriate for vehicular condition after rapid deceleration.

In addition, shifting the present transmission 1 according to Embodiment 1 to a subsequent change-speed stage that is lower than the subsequent change-speed stage that the change-speed controller 51 has predicted or estimated, and judging a vehicle's deceleration by comparing computed decelerations with a predetermined value, result in reducing the load to the controller 5 for carrying out these operations.

Embodiment No. 2

Figure 4:
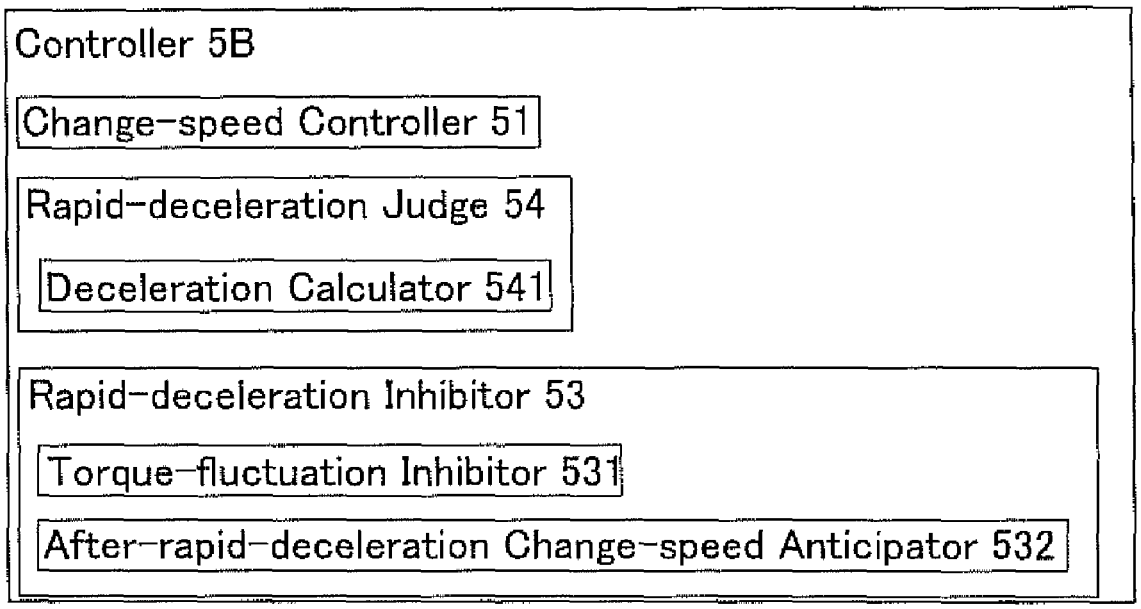
FIG. 4 is an explanatory block diagram for illustrating a controller 5B that makes the transmission 1 according to Embodiment No. 2.

As illustrated in FIG. 4, the present transmission 1 and shift-control method for transmission according to Embodiment No. 2 uses a controller 5B that comprises a change-speed controller 51, a rapid-deceleration judge 54 and a rapid-deceleration processor 53. As shown in the drawing, the controller 5B being directed to the transmission 1 according to Embodiment No. 2 is a device that is similar to the controller 5 being directed to the transmission according to Embodiment No. 1. Note however that the rapid-deceleration judge 54 substitutes for the rapid-deceleration judge 52, one of the elements of the controller 5. In essence, the transmission 1 and shift-control method for transmission according to Embodiment No. 2 produce the same advantageous effects as those of the transmission 1 and shift-control method for transmission according to Embodiment No. 1.

Meanwhile, the controller 5B comprises the same rapid-deceleration processor 53 as that the controller 5 being relevant to the transmission 1 according to Embodiment No. 1 uses.

Figure 5:
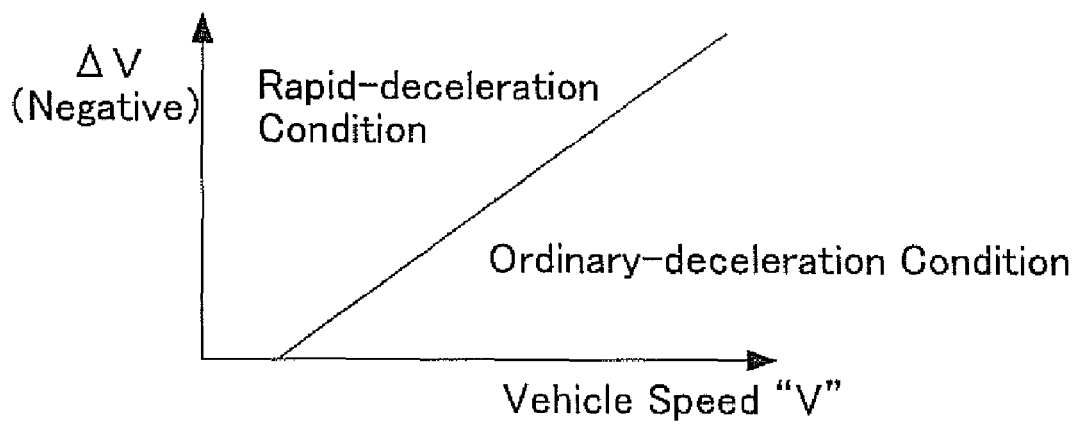
FIG. 5 is a graphical deceleration judgment map that the controller 5B of the transmission 1 according to Embodiment No 2 uses to judge a vehicle's deceleration condition.

The rapid-deceleration judge 54 is provided with a deceleration calculator 541. The deceleration calculator 541 is identical with the deceleration calculator 521 of the controller 5 that is directed to the transmission 1 according to Embodiment No. 1. After the deceleration calculator 541 calculates a deceleration, the rapid-deceleration judge 54 judges whether a vehicle is decelerating by another deceleration "$\Delta V$," which is computed using a deceleration judgment map, as well as a current vehicular condition. The deceleration judgment map is prepared in advance. As illustrated in FIG. 5, the deceleration judgment map is a graphical map for judging whether a vehicle is in rapid-deceleration condition or in ordinary-deceleration condition by vehicle speed "V" and decelerations "$\Delta V$," for instance. Moreover, it is possible to make the deceleration judgment map beforehand based on vehicular conditions other than vehicle speeds that are obtainable or retrievable from vehicle. In addition, it is possible to combine a plurality of vehicular conditions in a plurality of sets to prepare the deceleration judgment map. Moreover, it is possible to judge whether a vehicle is decelerating rapidly using a plurality of decelerations.

Next, a shift-control method for transmission will be described, shift-control method which the present transmission 1 according to Embodiment No. 2 employs. The controller 5B controls the transmission 1. A flowchart for the shift-control method for the transmission 1 that the controller 5B executes representatively can be expressed in the virtually same manner as that of the shift-control method according to Embodiment No. 1 shown in FIG. 3.

However, the controller 5B operates differently at the rapid-deceleration judging step "S120" and rapid-deceleration re-judging step "S150" at which the controller 5B judges whether a vehicle is decelerating rapidly or decelerating ordinarily. At the two steps, the controller 5B judges from a computed deceleration "$\Delta V$" and a current vehicular condition using the deceleration judgment map (e.g., FIG. 5) whether a vehicle is in rapid-deceleration condition or not.

The present transmission 1 and shift-control method for transmission according to Embodiment No. 2 comprise the controller 5B that uses the deceleration judgment map shown in FIG. 5 in order to judge or determine whether a vehicle is decelerating rapidly or decelerating ordinarily. Therefore, it is possible to judge or determine more accurately whether a vehicle is in rapid-deceleration or not than the transmission 1 and shift-control method for transmission according to Embodiment No. 1 where the judgment or determination is done by comparing decelerations and a predetermined value without considering any state of the vehicle.

Embodiment No. 3

Figure 6:
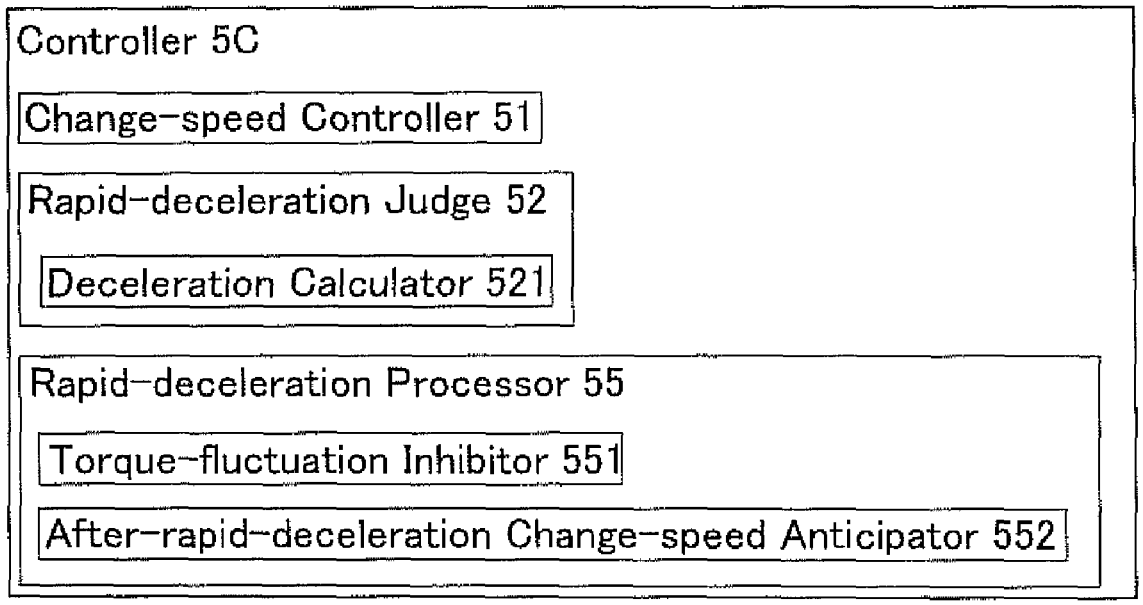
FIG. 6 is an explanatory block diagram for illustrating a controller 5C that makes the transmission 1 according to Embodiment No. 3.

As illustrated in FIG. 6, the present transmission 1 and shift-control method for transmission according to Embodiment No. 3 uses a controller 5C that comprises a change-speed controller 51, a rapid-deceleration judge 52 and a rapid-deceleration processor 55. As shown in the drawing, the controller 5C being directed to the transmission 1 according to Embodiment No. 3 substitutes for the controller 5 being directed to the transmission 1 according to Embodiment No. 1. Note that the rapid-deceleration processor 55 substitutes for the rapid-deceleration processor 53, one of the elements of the controller 5. In essence, the transmission 1 and shift-control method for transmission according to Embodiment No. 3 produce the same advantageous effects as those of the transmission 1 and shift-control method for transmission according to Embodiment No. 1.

Meanwhile, the controller 5B comprises the same rapid-deceleration judge 52 as that the controller 5 being relevant to the transmission 1 according to Embodiment No. 1 uses.

Figure 7:
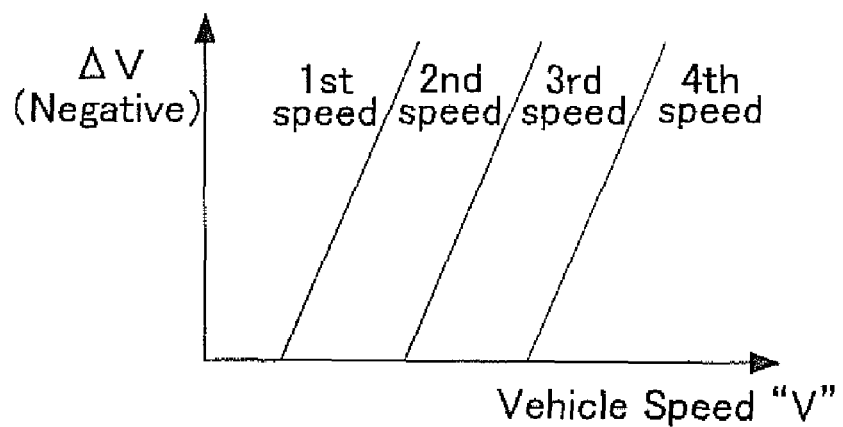
FIG. 7 is a graphical shift map for rapid deceleration that the controller 5C of the transmission 1 according to Embodiment No 3 uses.

The rapid-deceleration processor 55 is provided with a torque-fluctuation inhibitor 551, and an after-deceleration change-speed anticipator 552. The torque-fluctuation inhibitor 551 is identical with the torque-fluctuation inhibitor 531 of the controller 5 that is directed to the transmission 1 according to Embodiment No. 1. The after-rapid-deceleration change-speed stage anticipator 552 anticipates or estimates a subsequent change-speed stage from a vehicle's state and deceleration with reference to a shift map for rapid deceleration. As illustrated in FIG. 7, the shift map for rapid deceleration is prepared so that the controller 5C can select a change-speed stage that is suitable for the vehicle after rapid deceleration from a relationship between vehicle speed "V" and deceleration "$\Delta V$." The shift map for rapid deceleration can be made by combining the vehicle's states other than the vehicle speeds and decelerations variously in order to enable the after-rapid-deceleration change-speed stage anticipator 552 to predict or estimate a subsequent change-speed stage more suitably.

Next, a shift-control method for transmission will be described, shift-control method which the present transmission 1 according to Embodiment No. 3 employs. The controller 5C controls the transmission 1. A flowchart for the shift-control method for the transmission 1 that the controller 5C executes representatively can be expressed in the virtually same manner as that of the shift-control method according to Embodiment No. 1 shown in FIG. 3.

However, the controller 50 is distinguished from the controller 5 in that it consults the shift map for rapid deceleration illustrated in FIG. 7, for instance, to anticipate or estimate a subsequent change-speed stage from the deceleration "$\Delta V$" and vehicle speed "V" at the after rapid-deceleration change-speed stage anticipating sub-step "S132."

The present transmission 1 and shift-control method for transmission according to Embodiment No. 3 makes it possible to anticipate or estimate a subsequent change-speed stage that is more adequate for restarting or reaccelerating a vehicle after rapid deceleration, because the controller 5C uses the shift map for rapid deceleration shown in FIG. 7 to predict or estimate the subsequent change-speed stage.

Embodiment No. 4

Figure 8:
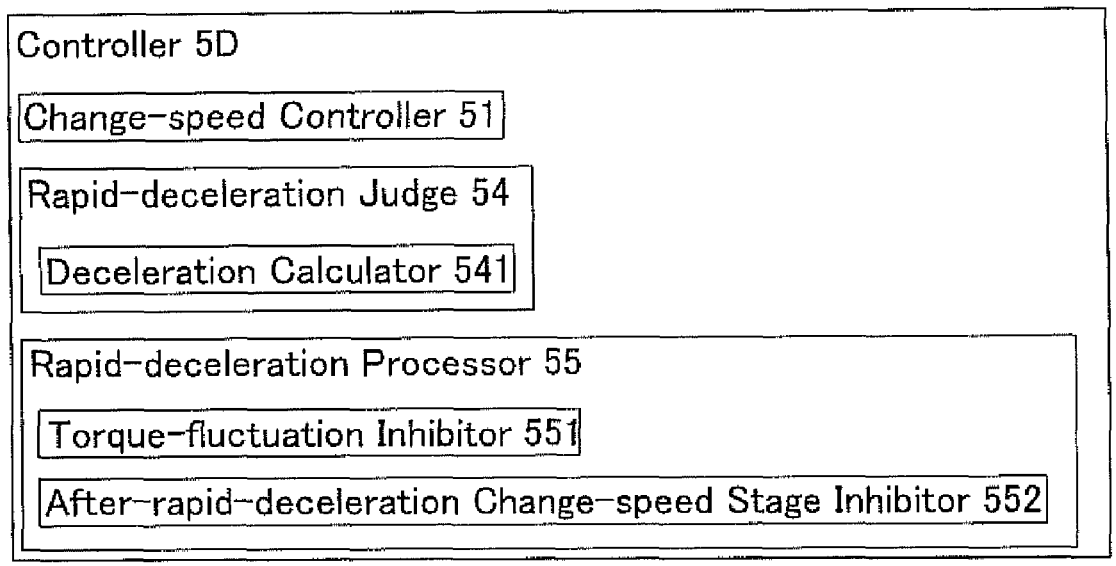
FIG. 8 is an explanatory block diagram for illustrating a controller 5D that makes the transmission 1 according to Embodiment No. 4.

As illustrated in FIG. 8, the present transmission 1 and shift-control method for transmission according to Embodiment No. 4 uses a controller 5D that comprises a change-speed controller 51, a rapid-deceleration judge 54 and a rapid-deceleration processor 55. As shown in the drawing, the controller 5D being directed to the transmission 1 according to Embodiment No. 4 substitutes for the controller 5 being directed to the transmission 1 according to Embodiment No. 1. Note that the rapid-deceleration judge 54 and rapid-deceleration processor 55 substitute for the rapid-deceleration judge 52 and rapid-deceleration processor 53, two of the elements of the controller 5, respectively. In essence, the transmission 1 and shift-control method for transmission according to Embodiment No. 4 produce the same advantageous effects as those of the transmission 1 and shift-control method for transmission according to Embodiment Nos. 1 through 3.

Meanwhile, the controller 5D comprises the same rapid-deceleration judge 54 as that the controller 5B being relevant to the transmission 1 according to Embodiment No. 2 uses. Moreover, the controller 5D comprises the same rapid-deceleration processor 55 as that the controller 5C being relevant to the transmission 1 according to Embodiment No. 3 uses.

Next, a shift-control method for transmission will be described, shift-control method which the present transmission 1 according to Embodiment No. 4 employs. A flowchart for the shift-control method for the transmission 1 that the controller 5D executes representatively can be expressed in the virtually same manner as that of the shift-control method according to Embodiment No. 1 shown in FIG. 3. Note however that the controller 5D is operated at the rapid-deceleration judging step "S120" and rapid-deceleration re-judging step "S150" in the same manner as the controller 5B is operated in the shift-control method for transmission according to Embodiment No. 2. Moreover, the controller 50 is operated at the after-rapid-deceleration change-speed stage anticipating sub-step "S132" in the same manner as the controller 5C is operated in the shift-control method for transmission according to Embodiment No. 3.

The present transmission 1 and shift-control method for transmission according to Embodiment No. 4 comprise the controller 5D that uses the deceleration judgment map shown in FIG. 5 in order to judge or determine whether a vehicle is decelerating rapidly or decelerating ordinarily. Accordingly, it is possible to judge or determine more accurately whether a vehicle is in rapid-deceleration or not. Moreover, the present transmission 1 and shift-control method for transmission according to Embodiment No 4 comprises the controller 5D that consults the shift map for rapid deceleration illustrated in FIG. 7 in order to anticipate or estimate a change-speed stage for restarting or reaccelerating a vehicle after rapid deceleration. Consequently, it is possible to predict or estimate a subsequent change-speed stage that is more suitable for after-rapid-deceleration vehicular conditions, respectively.

Embodiment No. 5

Figure 9:
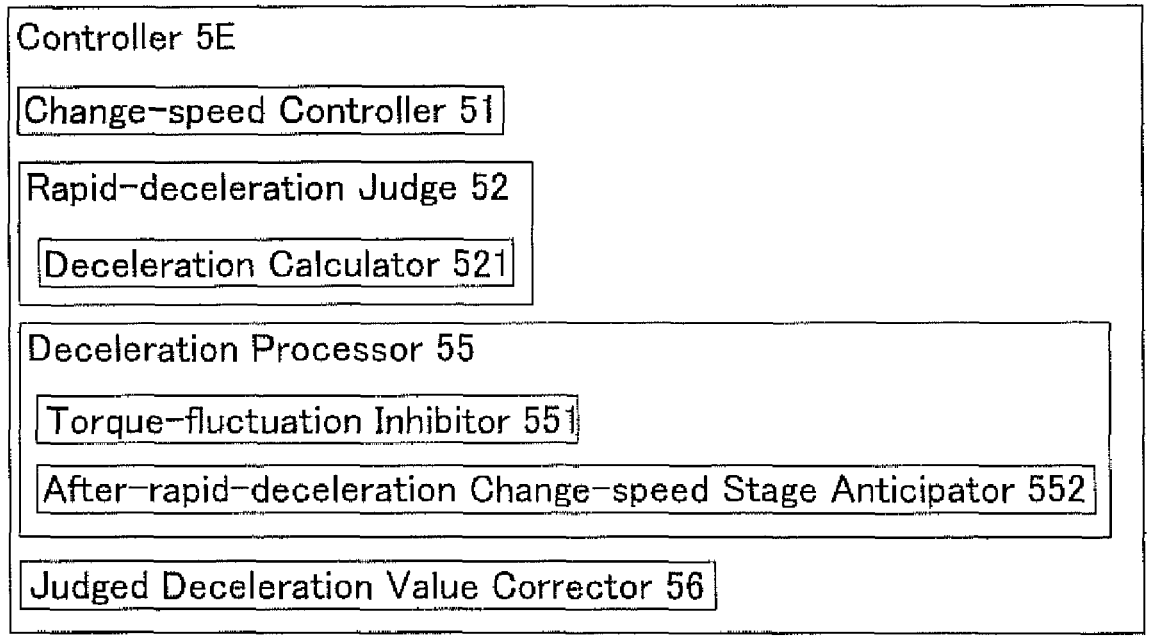
FIG. 9 is an explanatory block diagram for illustrating a controller 5E that makes the transmission 1 according to Embodiment No. 5.

As illustrated in FIG. 9, the present transmission 1 and shift-control method for transmission according to Embodiment No. 5 uses a controller 5E that comprises a change-speed controller 51, a rapid-deceleration judge 52, a rapid-deceleration processor 55 and a judged deceleration value corrector 56. As shown in the drawing, the controller 5E being directed to the transmission 1 according to Embodiment No. 5 substitutes for the controller 5 being directed to the transmission 1 according to Embodiment No. 1. However, note that, in order to make the controller 5E, the rapid-deceleration 55 substitutes for the rapid-deceleration processor 53, one of the elements of the controller 5, and the judged deceleration value corrector 56 is added to the controller 5. In essence, the transmission 1 and shift-control method for transmission according to Embodiment No. 5 produce the same advantageous effects as those of the transmission 1 and shift-control method for transmission according to Embodiment No. 1.

The judged deceleration value corrector 56 computes a deceleration "ΔV" when a driver turns on a brake or steps on a brake pedal. Then, the judged deceleration value corrector 56 corrects a predetermined value "Vs," which the rapid-deceleration judge 52 uses, with the computed deceleration "ΔV." Note that the judged deceleration value corrector 56 carries out the correction when the computed deceleration "ΔV" falls within a prescribed range in which the predetermined value is present; whereas the judged deceleration value corrector 56 does not carry out the correction when the computed deceleration "ΔV" falls outside the prescribed range. The judged deceleration value corrector 56 corrects the predetermined value "Vs" by following expression (1):

$$\text{``}Vs\text{''} = \text{``}Vs\text{''} + (\text{``}\Delta V\text{''} - \text{``}Vs\text{''}) \times \alpha \quad (1)$$

Figure 10:
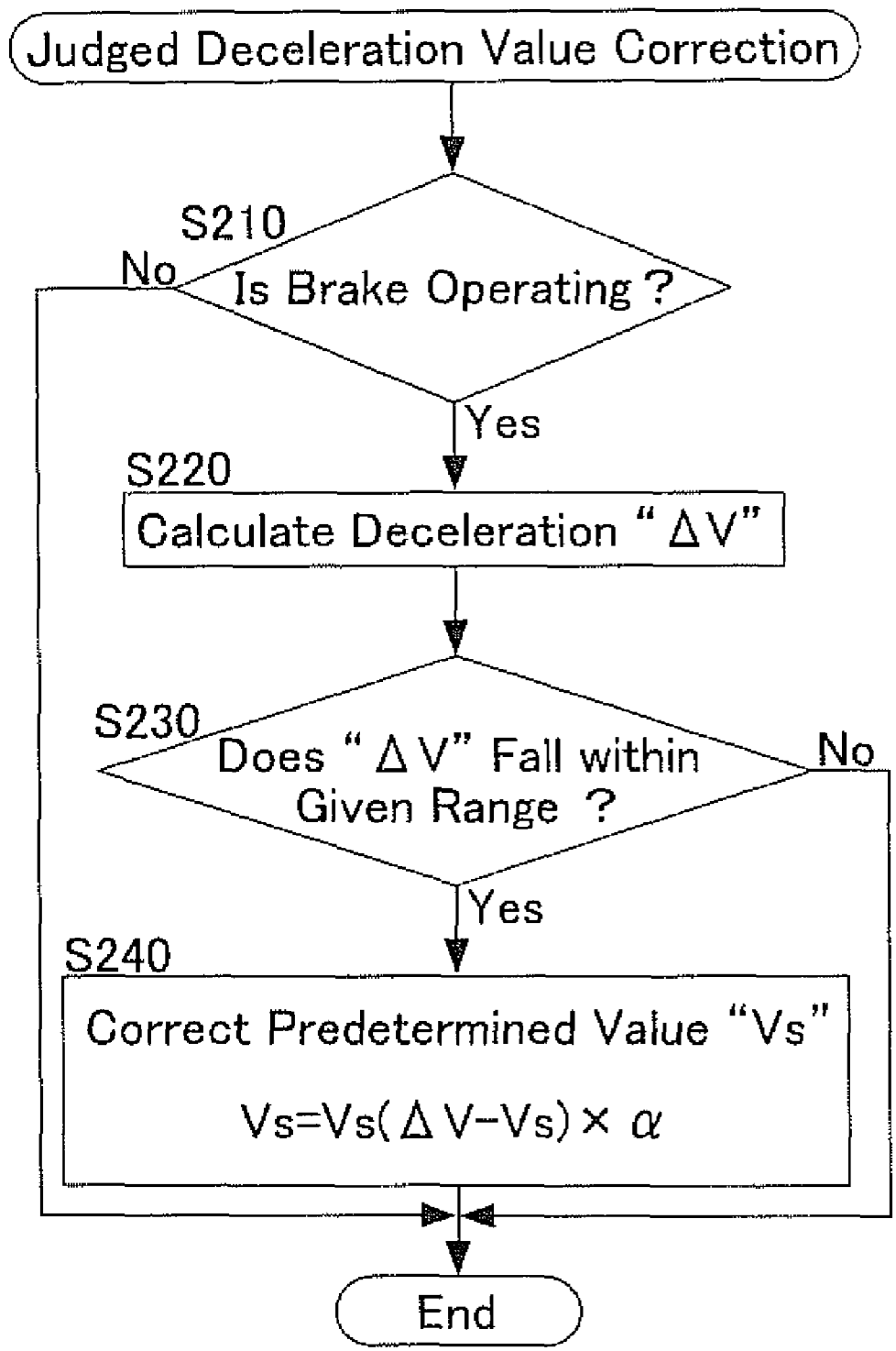
FIG. 10 is a flowchart for correcting judged deceleration value that the controller 5E of the transmission 1 according to Embodiment No. 5 uses.

Next, a shift-control method for transmission will be described, shift-control method which the present transmission 1 according to Embodiment No. 5 employs. The controller 5E controls the transmission 1. A flowchart for the shift-control method for the transmission 1 that the controller 5E executes representatively can be expressed in the virtually same manner as that of the shift-control method according to Embodiment No. 1 shown in FIG. 3. Note however that the shift-control method according to Embodiment No. 5 further comprises additional control steps that are specified in another flowchart as illustrated in FIG. 10, for instance. Specifically, the flowchart is adapted for correcting judged deceleration value, that is, for having the controller 5E correct a predetermined value that the corrector 5E uses to judge or determine whether a vehicle is decelerating rapidly or not.

As shown in FIG. 10, the flowchart for correcting judged deceleration value, the controller 5E judges whether a driver turns on a brake or steps on a brake pedal at a brake on/off judging step "S210." When the brake is turned off, the controller 5E cancels the following steps to end this particular control procedure that the flowchart illustrates. When the brake is turned on, the controller 5E computes a deceleration "ΔV" at a corrective deceleration computing step "S220." Since the deceleration "ΔV" is a rate of decrease of a vehicle's speed within a constant period of time, the controller 5E collects states of the vehicle (e.g., vehicle speeds) as data to calculate the deceleration "ΔV." Then, at a correction needed/unneeded judging step "S230," the controller 5E judges whether the calculated deceleration "ΔV" falls within a prescribed range with respect to a predetermined value "Vs" or not. When the computed deceleration "ΔV" falls outside the prescribed range, the controller 5E cancels the next step to end the control procedure that the flowchart shows, because it is not necessary to correct the predetermined value "Vs." On the other hand, the controller 5E corrects the predetermined value "Vs" using the calculated deceleration "ΔV" at a judged deceleration value correcting step "S240" that follows when the deceleration "ΔV" falls within the prescribed range.

The present transmission 1 and shift-control method for transmission according to Embodiment No. 5 make it possible to judge whether a vehicle is decelerating rapidly or not more suitably for every vehicle or drivers' driving manners, because the controller 5E can correct the predetermined value that the controller 5E uses to judge or determine if a vehicle is in rapid-deceleration or not. Moreover, the controller 5B can process or handle various vehicular conditions more adequately.

In the present transmission 1 and shift-control method for transmission according to Embodiment No 5, the controller 5E corrects the predetermined value that the controller 5 uses in the transmission 1 and shift-control method for transmission according to Embodiment No. 1. Note however that it is likewise feasible to have the controller 5E correct the deceleration judgment map shown in FIG. 5 that the controller 5B uses in the transmission 1 and shift-control method for transmission according to Embodiment No. 2.

Embodiment No. 6

Figure 11:
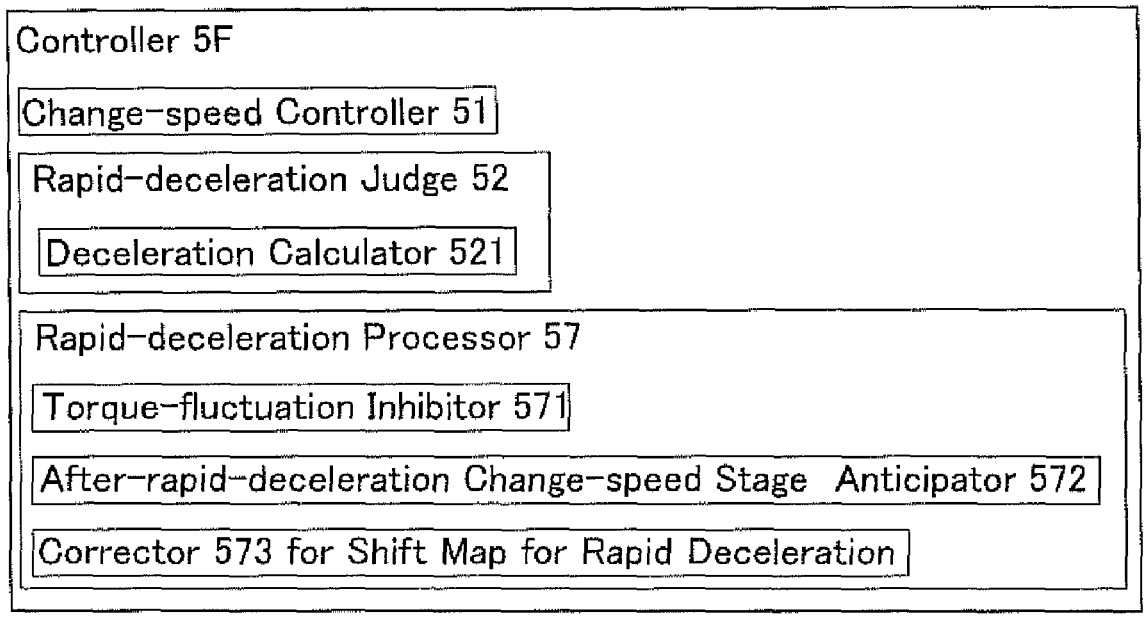
FIG. 11 is an explanatory block diagram for illustrating a controller 5F that makes the transmission 1 according to Embodiment No. 6.
Figure 12:
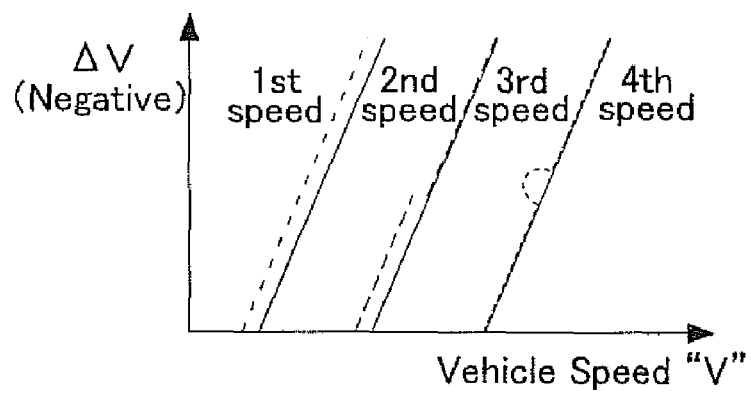
FIG. 12 is a graphical explanatory diagram for illustrating how to correct a shift map for rapid deceleration that the controller 5F of the transmission 1 according to Embodiment No 6 uses.

As illustrated in FIG. 11, the present transmission 1 and shift-control method for transmission according to Embodiment No. 6 uses a controller 5F that comprises a change-speed controller 51, a rapid-deceleration judge 52 and a rapid-deceleration processor 57. As shown in the drawing, the controller 5F being directed to the transmission 1 according to Embodiment No. 6 substitutes for the controller 5 being directed to the transmission 1 according to Embodiment No. 1. However, note that, in order to make the controller 5F, a corrector 573 for correcting shift map for rapid deceleration is added to the rapid-deceleration processor 55, one of the elements of the controller 5C that is relevant to the transmission 1 and shift-control method for transmission according to Embodiment No. 3. In essence, the transmission 1 and shift-control method for transmission according to Embodiment No. 6 produce the same advantageous effects as those of the transmission 1 and shift-control method for transmission according to Embodiment No. 3.

The rapid-deceleration judge 57 is provided with a torque-fluctuation inhibitor 571, an after-rapid-deceleration change-speed stage anticipator 572, and the corrector 573 for correcting shift map for rapid deceleration. The torque-fluctuation inhibitor 571 is identical with the torque-fluctuation inhibitor 571 of the controller 5C that is directed the transmission 1 according to Embodiment No. 3. Moreover, the after-rapid-deceleration change-speed stage anticipator 572 is identical with the after-rapid-deceleration change-speed stage anticipator 572 of the controller 5C that is directed the transmission 1 according to Embodiment No. 3. The corrector 573 corrects the shift map for rapid deceleration shown in FIG. 7, for instance, based on a subsequent change-speed stage, which the after-rapid-deceleration change-speed stage anticipator 572 has anticipated or estimated, and another change-speed stage, which the change-speed controller 51 has picked up or elected. It is preferable to select one of the subsequent change-speed stages that is used for the correction, that is, the change-speed stage that the change-speed controller 51 elects, based on a vehicular condition of a vehicle that has come out of rapid-deceleration conditions. This is because a change-speed stage that fits for restarting or reaccelerating a vehicle after rapid deceleration is usually identical with the one, which is derived from a common shift map, for starting or accelerating the vehicle. As illustrated with the three dashed lines in FIG. 12, the corrector 573 can preferably correct the shift map for rapid deceleration in the following manners. For example, it is possible to have the corrector 573 correct the change-speed line between the first speed and the second speed entirely as shown in the drawing. Moreover, it is possible to have the corrector 573 correct the change-speed line between the second speed and the third speed, or the change-speed line between the third speed and the fourth speed, partially as shown in the drawing.

Next, a shift-control method for transmission will be described, shift-control method which the present transmission 1 according to Embodiment No. 6 employs. The controller 5F controls the transmission 1. A flowchart for the shift-control method for the transmission 1 that the controller 5F executes representatively is virtually identical with the flowchart shown in FIG. 3 that the controller 5 being directed the shift-control method according to Embodiment No. 1 executes representatively.

Figure 13:
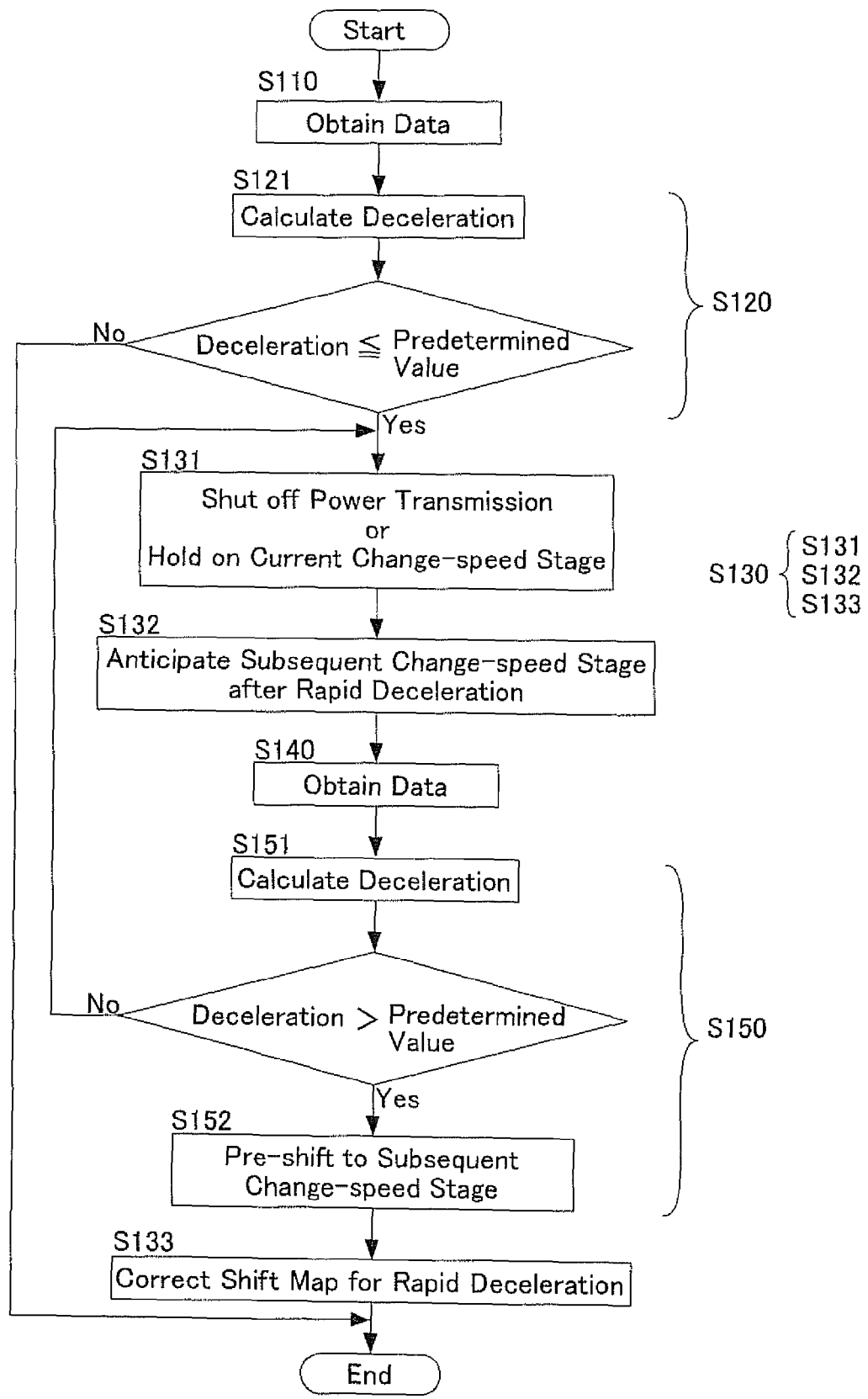
FIG. 13 is a representative flowchart for illustrating a method of shift control for transmission according to Embodiment No. 6.

In addition to the respective steps that the controller 5 being relevant to the shift-control method according to Embodiment No. 1 carries out as illustrated in FIG. 3, the shift-control method for transmission according to Embodiment No 6 further comprises a rapid-deceleration shift-map correcting step "S133," after the pre-shifting step "S152" and before ending the control procedure, as shown in FIG. 13. The controller 5F corrects a shift map for rapid deceleration (e.g., FIG. 7) on the basis of a subsequent change-speed stage, which the after-deceleration change-speed stage anticipator 571 has anticipated or estimated at the after-rapid-deceleration anticipating step "S132," and another subsequent change-speed stage, which the change-speed controller 51 has picked up or elected. As for the correction method, it is possible to name the above-described correction methods that the rapid-deceleration shift-map corrector 573 can employ. Note that it is allowable for the controller 5F to execute the rapid-deceleration shift-map correcting step "S133" prior to the pre-shifting step "S152." That is, it is permissible to operate the controller 5F so as to carry out the correction method when a vehicle has come out of rapid-deceleration condition. This is because using a subsequent change-speed stage that the change-speed controller 51 has elected under such a vehicular condition that a vehicle has ceased decelerating rapidly makes it possible to correct the original rapid-deceleration shift map to the one that enables the controller 5F to predict or estimate a change-speed stage that fits for an occasion when the vehicle has returned back to ordinary condition from rapid-deceleration condition after the vehicle has come out of the rapid-deceleration condition.

In the present transmission 1 and shift-control method for transmission according to Embodiment No. 6, the controller 5F is operated to correct a rapid-deceleration shift map (e.g., FIG. 7) that is used for anticipating or estimating a change-speed stage that fits for restarting or reaccelerating a vehicle after rapid deceleration based on a subsequent change-speed stage, which the controller 5F has predicted or estimated actually, and another subsequent change-speed stage, which the change-speed controller 51 has picked up or elected. Therefore, the transmission 1 and shift-control method for transmission according to Embodiment No. 6 make it possible for the controller 5F to consult a rapid-deceleration shift map that enables the controller 5F to anticipate or estimate a more adequate change-speed stage.

Other Embodiments

Although the present invention has been described in detail with reference to some of the preferred embodiments, it is not at all limited to above-described Embodiment Nos. 1 through 6. For example, the transmission 1 except for the controllers 5, 5B, 5C, 5D, 5E and 5F can be transmissions having dual-clutch mechanisms other than the dual-clutch mechanism that is described in the present specification.

Having now fully described the present invention, it will be apparent to one of ordinary skill in the art that many changes and modifications can be made thereto without departing from the spirit or scope of the present invention as set forth herein including the appended claims.

What is claimed is:
1. A transmission, comprising:
a first clutch being capable of switching between a connection state being connected to a power source and a disconnection state being disconnected from the power source;
a second clutch being capable of switching between a connection state being connected to the power source and a disconnection state being disconnected from the power source;
a first input shaft being detachably connected to the power source by the first clutch;
a second input shaft being detachably connected to the power source by the second clutch;
an output shaft;

a first change-speed mechanism being disposed between the first input shaft and the output shaft, and comprising a first gear mechanism for making a combination of a plurality of change-speed stages and a first gear-mechanism selector for selecting one of the change-speed stages;

a second change-speed mechanism being disposed between the second input shaft and the output shaft, and comprising a second gear mechanism for making a combination of a plurality of change-speed stages and a second gear-mechanism selector for selecting one of the change-speed stages;

a controller for controlling the first clutch, the second clutch, the first gear-mechanism selector, and the second gear-mechanism selector, and comprising a change-speed controller for adopting one of the change-speed stages, which can be selected by one of the first gear-mechanism selector and second gear-mechanism selector being set on one of the first input shaft and second input shaft that the first clutch and/or second clutch disconnects from the power source, as a subsequent change-speed stage and then having the one of the first gear-mechanism selector and second gear-mechanism selector operate with the subsequent change-speed stage;

the controller further comprising:

a rapid-deceleration judge for judging whether a vehicle is in ordinary condition or in rapid-deceleration condition;

a rapid-deceleration processor including a torque-fluctuation inhibitor, and an after-rapid-deceleration change-speed stage anticipator;

the torque-fluctuation inhibitor being adapted for putting the one of the first gear-mechanism selector and second gear-mechanism selector in no-power transmission state in which power transmission from the power source is shut off, or in power transmission state in which the one of the first gear-mechanism selector and the second gear-mechanism selector is held in power transmission by way of a current change-speed stage or other change-speed stages being lower than the current change-speed stage, when the vehicle is in the rapid-deceleration condition; and the after-rapid-deceleration change-speed stage anticipator being adapted for anticipating a subsequent change-speed stage being adapted for restarting or reaccelerating the vehicle that has come out of the rapid-deceleration condition, and then operating the other one of the first gear-mechanism selector and second gear-mechanism selector that can cope with the resulting subsequent change-speed stage.

2. The transmission according to claim 1, wherein the after-rapid-deceleration change-speed stage anticipator anticipates at least one change-speed stage from the group consisting of the lowest change-speed stage of the change-speed stages of one of the first gear mechanism and second gear mechanism that is associated with one of the first clutch and second clutch being put in the connected and disconnected states alternately, a change-speed stage that is lower by one stage than the subsequent change-speed stage that the change-speed controller has adopted, and change-speed stages that are lower by many stages than the adopted subsequent change-speed stage.

3. The transmission according to claim 1, wherein the after-rapid-deceleration change-speed stage anticipator consults a shift map for rapid deceleration to anticipate the subsequent change-speed stage using a state of the vehicle.

4. The transmission according to claim 3, wherein the controller further comprises a corrector for correcting the shift map for rapid deceleration on the basis of comparison between the subsequent change-speed stage, which the after-rapid-deceleration change-speed stage anticipator has anticipated, and a subsequent change-speed stage, which is derived from a vehicular condition of the vehicle that has come out of the rapid-deceleration condition as well as a common shift map.

5. The transmission according to claim 1, wherein the rapid-deceleration judge comprises a deceleration calculator for calculating deceleration, and judges that the vehicle is in the rapid-deceleration condition when a calculated deceleration is greater than a predetermined value.

6. The transmission according to claim 1, wherein the rapid-deceleration judge comprises a deceleration calculator for calculating deceleration, and an accessible map for making it possible to judge whether the vehicle is in the rapid-deceleration condition or in ordinary-deceleration condition on the basis of comparison between a calculated deceleration and a state of the vehicle, and applies a current deceleration and a current state of the vehicle to the accessible map to judge whether the vehicle is in the rapid-deceleration condition or in the ordinary-deceleration condition.

7. A method of shift control for transmission:

the transmission comprising:

a first clutch being capable of switching between a connection state being connected to a power source and a disconnection state being disconnected from the power source;

a second clutch being capable of switching between a connection state being connected to the power source and a disconnection state being disconnected from the power source;

a first input shaft being detachably connected to the power source by the first clutch;

a second input shaft being detachably connected to the power source by the second clutch;

an output shaft;

a first change-speed mechanism being disposed between the first input shaft and the output shaft, and comprising a first gear mechanism for making a combination of a plurality of change-speed stages and a first gear-mechanism selector for selecting one of the change-speed stages;

a second change-speed mechanism being disposed between the second input shaft and the output shaft, and comprising a second gear mechanism for making a combination of a plurality of change-speed stages and a second gear-mechanism selector for selecting one of the change-speed stages;

a controller for controlling the first clutch, the second clutch, the first gear-mechanism selector, and the second gear-mechanism selector, and comprising a change-speed controller for adopting one of the change-speed stages, which can be selected by one of the first gear-mechanism selector and second gear-mechanism selector being set on one of the first input shaft and second input shaft that the first clutch and/or second clutch disconnects from the power source, as a subsequent change-speed stage and then having the one of the first gear-mechanism selector and second gear-mechanism selector operate with the subsequent change-speed stage;

the method comprising steps of:

having the controller judge whether a vehicle is in ordinary condition or in rapid-deceleration condition;

having the controller put the one of the first gear-mechanism selector and second gear-mechanism selector in no-power transmission state in which power transmission from the power source is shut off, or in power transmission state in which the one of the first gear-mechanism selector and the second gear-mechanism selector is held in power transmission by way of a current change-speed stage or other change-speed stages being lower than the current change-speed stage, when the vehicle is in the rapid-deceleration condition;

having the controller anticipate a subsequent change-speed stage being adapted for restarting or reaccelerating the vehicle that has come out of the rapid-deceleration condition; and having the controller operate the other one of the first gear-mechanism selector and second gear-mechanism selector that can cope with the resulting subsequent change-speed stage.

8. The method according to claim 7, wherein the controller is operated to anticipate at least one change-speed stage from the group consisting of the lowest change-speed stage of the change-speed stages of one of the first gear mechanism and second gear mechanism that is associated with one of the first clutch and second clutch being put in the connected and disconnected states alternately, a change-speed stage that is lower by one stage than the subsequent change-speed stage that the change-speed controller has adopted, and change-speed stages that are lower by many stages than the adopted subsequent change-speed stage in the step of having the controller anticipate.

9. The method according to claim 7, wherein the controller is operated to consult a shift map for rapid deceleration to anticipate the subsequent change-speed stage using a state of the vehicle in the step of having the controller anticipate.

10. The method according to claim 9 further comprising a step of having the controller correct the shift map for rapid deceleration on the basis of comparison between the subsequent change-speed stage, which the controller has anticipated in the step of having the controller anticipate, and a subsequent change-speed stage, which is derived from a vehicular condition of the vehicle that has come out of the rapid-deceleration condition as well as a common shift map.

11. The method according to claim 7, wherein the controller is operated to calculate deceleration and judge that the vehicle is in the rapid-deceleration condition when a calculated deceleration is greater than a predetermined value in the step of having the controller judge.

12. The method according to claim 7, wherein the controller is operated to calculate deceleration, and to access a map for making it possible to judge whether the vehicle is in the rapid-deceleration condition or in ordinary-deceleration condition on the basis of comparison between a calculated deceleration and a state of the vehicle, and then to apply a current deceleration and a current state of the vehicle to the map to judge whether the vehicle is in the rapid-deceleration condition or in the ordinary-deceleration condition in the step of having the controller judge.

* * * * *

UNITED STATES PATENT AND TRADEMARK OFFICE
CERTIFICATE OF CORRECTION

PATENT NO.       : 8,256,312 B2
APPLICATION NO.  : 12/729970
DATED            : September 4, 2012
INVENTOR(S)      : Hiroki Hatori et al.

It is certified that error appears in the above-identified patent and that said Letters Patent is hereby corrected as shown below:

On the title page correct the Inventors section as follows:

[75] Inventors: Hiroki Hatori, Nishio (JP); Takeshige Miyazaki, Nishio (JP); Yoshiki Ito, Nishio (JP); Hiroshi Toyoda, Nishio (JP); Kiyoshi Nagami, Anjo (JP); Atsushi Takeuchi, Anjo (JP)

Signed and Sealed this
Sixth Day of November, 2012

David J. Kappos
*Director of the United States Patent and Trademark Office*